United States Patent
Farkas et al.

(10) Patent No.: US 10,762,031 B2
(45) Date of Patent: Sep. 1, 2020

(54) SYSTEM AND METHOD FOR SETTING EQUALIZATION FOR COMMUNICATION BETWEEN A PROCESSOR AND A DEVICE

(71) Applicant: DELL PRODUCTS, LP, Round Rock, TX (US)

(72) Inventors: Sandor Farkas, Round Rock, TX (US); Stuart Allen Berke, Austin, TX (US); Bhyrav M. Mutnury, Round Rock, TX (US)

(73) Assignee: Dell Products, L.P., Round Rock, TX (US)

(*) Notice: Subject to any disclaimer, the term of this patent is extended or adjusted under 35 U.S.C. 154(b) by 0 days.

(21) Appl. No.: 15/620,336

(22) Filed: Jun. 12, 2017

(65) Prior Publication Data
US 2018/0357066 A1     Dec. 13, 2018

(51) Int. Cl.
*G06F 13/42*     (2006.01)
*G06F 13/38*     (2006.01)
*H04L 25/03*     (2006.01)
*G06F 9/4401*    (2018.01)

(52) U.S. Cl.
CPC ........ *G06F 13/4282* (2013.01); *G06F 13/385* (2013.01); *G06F 9/4411* (2013.01); *G06F 2213/0026* (2013.01); *H04L 25/03878* (2013.01)

(58) Field of Classification Search
CPC ..... H04L 49/00; H04L 49/9057; H04L 41/12; H04L 69/324; H04L 49/90; H04L 25/03878; G06F 13/4269; G06F 13/4282; G06F 13/385; G06F 2213/0026; G06F 9/4411
See application file for complete search history.

(56) References Cited

U.S. PATENT DOCUMENTS

| | | | |
|---|---|---|---|
| 6,507,225 B2 | 1/2003 | Martin et al. | |
| 8,190,864 B1 | 5/2012 | Jordan et al. | |
| 9,866,443 B1* | 1/2018 | Shih | ........................ H04L 41/12 |
| 2006/0117200 A1 | 6/2006 | Bailey et al. | |
| 2011/0107031 A1 | 5/2011 | Anand et al. | |
| 2014/0244943 A1 | 8/2014 | Jacobs et al. | |
| 2016/0056979 A1 | 2/2016 | Berke et al. | |
| 2016/0087816 A1* | 3/2016 | Patel | ................. H04L 25/03878 375/232 |

FOREIGN PATENT DOCUMENTS

EP     0 258 697 A3     8/1987

* cited by examiner

*Primary Examiner* — Ernest Unelus
(74) *Attorney, Agent, or Firm* — Larson Newman, LLP

(57) ABSTRACT

An information handling system may include a central processing unit (CPU) and a device. The CPU may have an I/O system and be configured to host a BIOS. The device may be communicatively connected to the I/O system of the CPU by a connection. The BIOS may determine a communication protocol used by the device for communication and set an equalization of the I/O system for communication with the device based on the communication protocol used by the device.

15 Claims, 4 Drawing Sheets

SYSTEM AND METHOD FOR SETTING EQUALIZATION FOR COMMUNICATION BETWEEN A PROCESSOR AND A DEVICE

FIELD OF THE DISCLOSURE

This disclosure generally relates to information handling systems, and more particularly relates to setting equalization for communication between a processor and a device.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a processor, such as a CPU, and a device. The processor may have an I/O system and be configured to host a BIOS. The device may be communicatively connected to the I/O system of the processor by a connection. The BIOS may determine a communication protocol used by the device for communication and set an equalization of the I/O system for communication with the device based on the communication protocol used by the device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
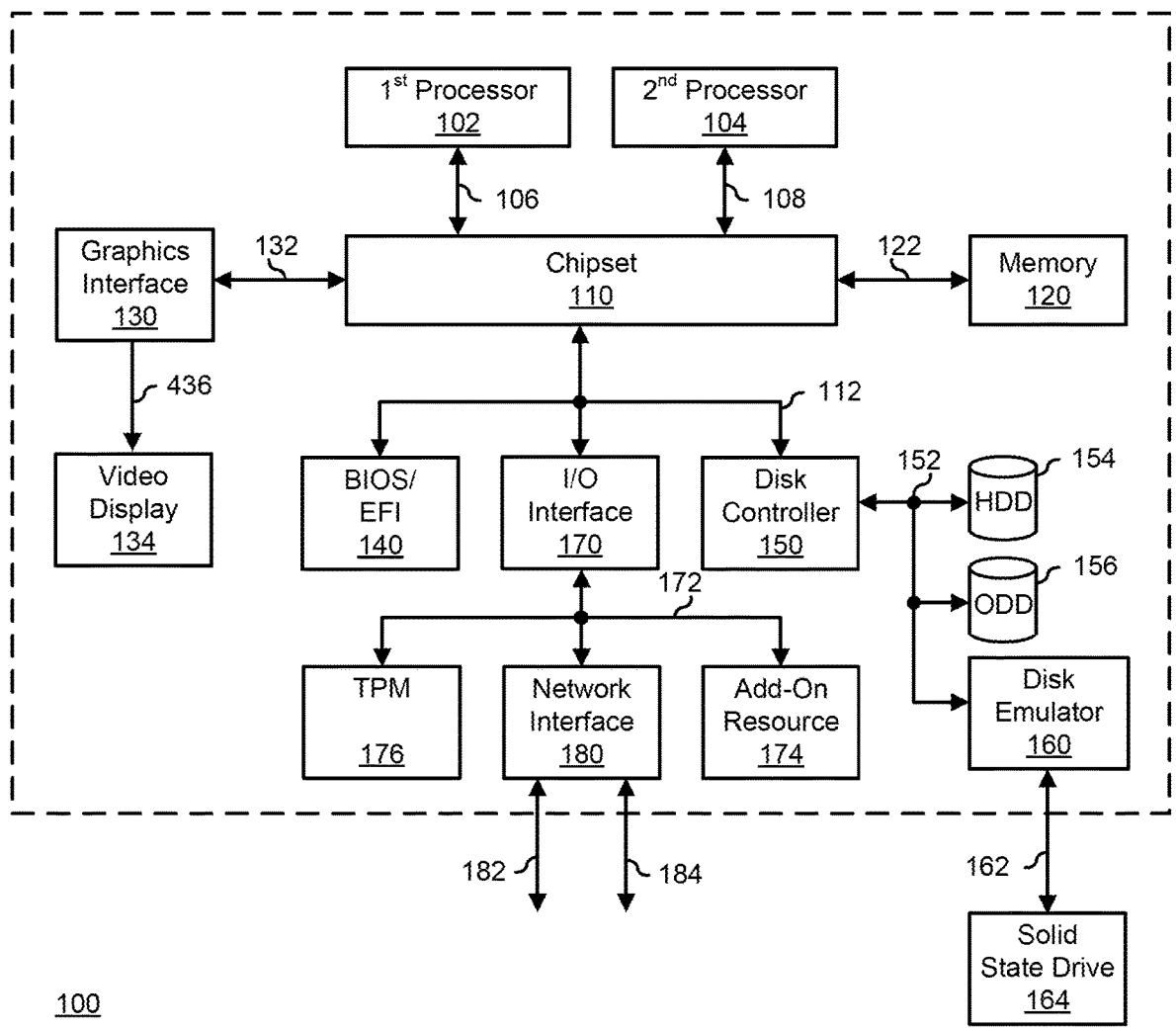
FIG. 1 is a block diagram illustrating a generalized information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a processor system which may be a System-on-a-Chip (SoC), a personal computer, a laptop computer, a smart phone, a tablet device or other consumer electronic device, storage array, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a SoC, or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174, to a TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

For the purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. An information handling system can include processing resources for executing machine-executable code, such as a central processing unit (CPU), a Programmable Logic Array (PLA), an embedded device such as a System-On-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various Input and Output (I/O) devices, such as a keyboard, a mouse, and a video display.

An example information handling system is a server. An example server may include a central processing unit (CPU) in communication with one or more devices, such as server storage devices. The CPU may include one or more Input/Output (I/O) systems and communicate with the one or more devices over the I/O systems according to one or more protocols. For example, a CPU I/O system may provide an I/O interface for the CPU to communicate with a server device. Different server devices may support and communicate according to different protocols.

A CPU I/O system providing an I/O interface for the CPU may communicate with a device according to a protocol supported by the device. Similarly, a device may communicate with a CPU according to a protocol supported by the CPU. Thus, the I/O system and I/O interface of a CPU may support multiple protocols for communication with server devices. The I/O interface may have a common physical footprint providing a common set of physical connections, and may support communication with a device according to different protocols. For example, an example server device may be a solid-state drive (SSD). Different SSDs may use or be configured to use different protocols. Thus, the CPU and CPU I/O system may communicate with different devices over the I/O interface according to different protocols.

A multi-modal I/O interface can support one or more communication protocols, such as Serial AT Attachment (SATA) protocol, Peripheral Component Interconnect Express (PCIe) protocol, Ethernet communication protocol, Graphics Output protocol (GOP) and Global Memory Interconnect (GMI) communication protocols. The CPU may set different equalizations for different communication protocols.

Different protocols such as communication protocols may have different protocol requirements or parameters, for example different communication parameters. For example, different protocols may operate at different frequencies, and as such may have different responses in a physical channel. Thus, a protocol operating at a relatively higher frequency relative to other protocols may experience a different signal attenuation in a physical channel. Different protocols may have different bit error tolerances and may have different eye requirements for signal acquisition. Furthermore, there may be different communication channel lengths for different devices, or the length of the communication channels may vary due to connector length differences. For example, there may be a cable connection to an I/O interface from a device, and hence relatively longer communication channel with relatively more attenuation, or a direct device connection to an I/O interface.

A CPU may perform equalization with regard to a communication channel to a device to ensure signal acquisition of signals over the communication channel. The CPU may determine the protocol used for communication over a communication channel and set the equalization based on the protocol. The CPU may further set equalization based upon the communication channel. The equalization may be dynamically set based upon the protocol used for communication, for example, and may be set during an initialization.

An I/O interface of a CPU may support a bus connection or a connection of multiple physical lines with a server device. The bus or multiple physical lines may include one or more sideband lines that may be used to indicate the protocol used by the server device. For example, a sideband line may provide a identification bit from server device to CPU, indicating to the CPU the protocol used for communication by the server device. The CPU may communicate or negotiate with the server device over the bus connection or multiple lines to determine the communication protocol used by the server device. For example, the CPU could attempt to communicate with the server device using one to more protocols over a connection with the server device. When the server device responds to a communication in a protocol, the CPU may determine that the server device communicates according to the responded-to protocol and use said protocol in communication with said server device.

Once the processor has determined the protocol used by a server device, the processor sets equalization parameters for the channel used to communicate with the server device according to the protocol used by the server device to communicate with the processor. As a result of communications between processor and server device, the server device may set equalization parameters at the server device based on communications from the processor and the protocol supported by the server device.

Equalization includes Feed Forward Equalization (FFE), Decision Feedback Equalization (DFE), Continuous Time Linear Equalization (CTLE), Analog Equalization (AE) (Inventors please confirm), Variable Gain Amplification (VGA), and boost (signal amplification). Thus setting equalization may involve setting FFE, DFE, CTLE, AE, VGA, and boost, or using a subset of FFE, DFE, CTLE, AE, VGA, and boost for equalization.

Figure 2:
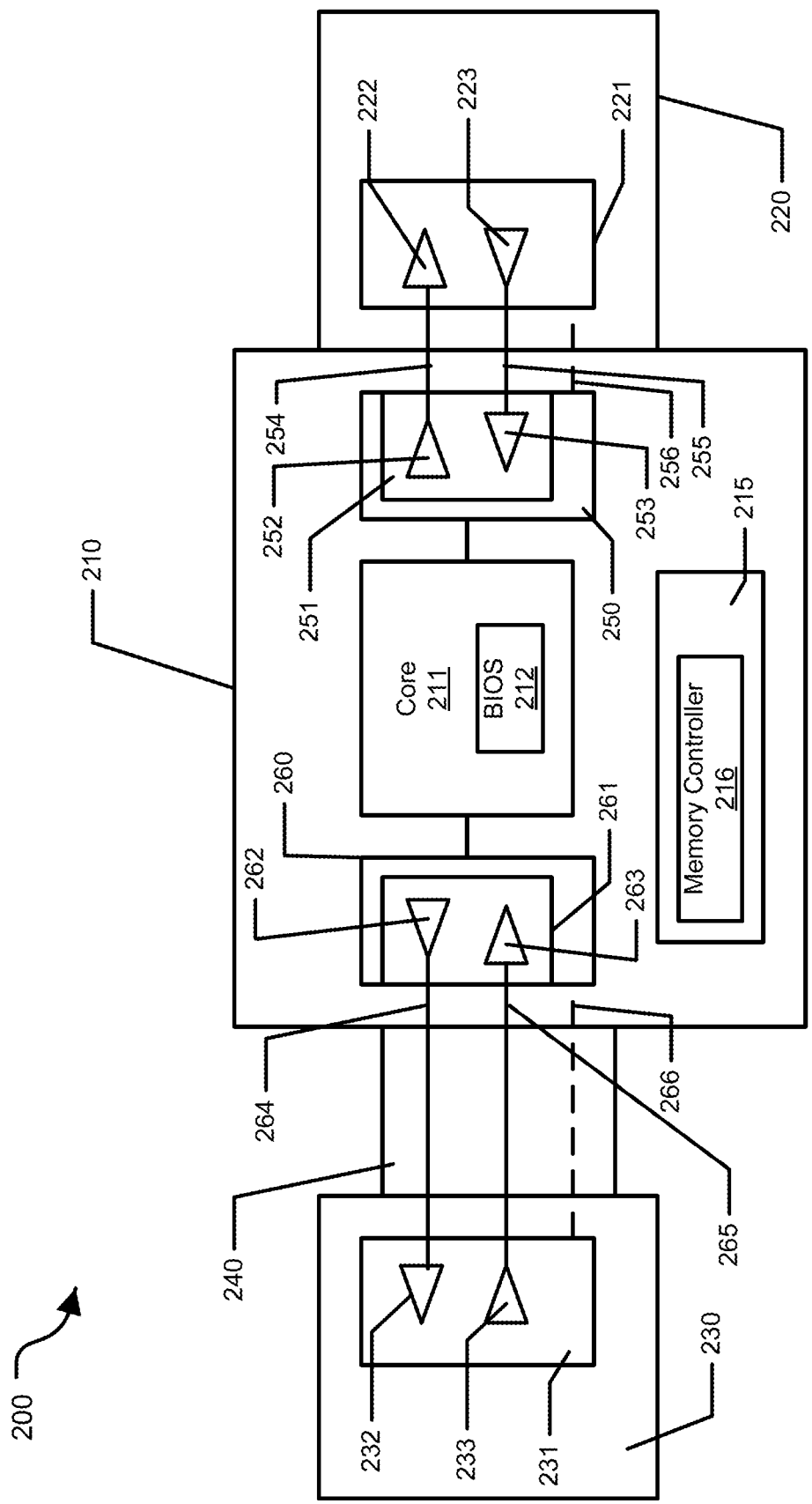
FIG. 2 illustrates an information handling system including a processor and device according to an embodiment of the present disclosure.

FIG. 2 shows a processor device information handling system 200. System 200 may be a part of a server. System 200 includes a processor or CPU 210, and server devices 220 and 230. Server device 220 is connected to CPU 210, and server device 230 is connected to CPU 210 by connector 240. Connector 240 may be a combination of conducting traces, connectors, boards, cables, and other conductors, this combination may provide a channel between 210 and 230. Device 230 may be physically separated from 210 by a distance, for example, of several inches. Server devices may include SSDs, NICs, storage controllers and graphics interfaces, for example. CPU 210 includes processor core(s) 211. Processor core(s) 211 may host a Basic Input/Output System (BIOS) 212. A BIOS is a type of firmware used to perform hardware initialization during the booting process, and to provide runtime services for operating systems and programs. BIOS firmware is built into computers and is the first software run. A BIOS initializes and tests the system hardware components, and loads a boot loader or an operating system, and provides an abstraction layer for hardware.

CPU 210 includes processor circuitry 215 which may include, for example, memory controller 216. CPU 210 further includes I/O systems 250 and 260. Processor core(s) 211 are connected to I/O systems 250 and 260, and BIOS 212 may configure I/O systems 250 and 260. I/O system 250 provides an I/O interface for connection to server device 220 and I/O system 260 provides an I/O interface for connection to server device 230 over connector 240.

I/O system 250 includes I/O circuitry such as protocol logic, equalization logic, and Serializer/Deserializer (SerDes) circuitry. I/O system 250 includes transmission and reception circuitry 251 which includes transmitter 252 and receiver 253. Transmitter 252 is connected to server device 220 with connection 254, receiver 253 is connected to server device 220 with connection 255, and I/O system 250 may also optionally be connected to server device 220 by connection 256 (indicated by the dash line connection) which may be a sideband connection between I/O system 250 and server device 220. Connections 254, 255, and 256 may be considered an I/O interface connecting I/O system 250 with server device 220.

Server device 220 includes transmission and reception circuitry 221 which includes receiver 222 corresponding to transmitter 252 and transmitter 223 corresponding to receiver 253. That is, receiver 222 is connected to transmitter 252 over connection 254 and receives data from transmitter 252 over connection 254. Similarly, transmitter 223 is connected to receiver 253 over connection 255 and transmits data to receiver 253 over connection 255. Thus connections 254 and 255 provide a communication channel between CPU 210 and server device 220.

I/O system 260 includes I/O circuitry such as protocol logic, equalization logic, and Serializer/Deserializer (SerDes) circuitry. I/O system 260 includes transmission and reception circuitry 261 which includes transmitter 262 and receiver 263. Transmitter 262 is connected to server device 230 with connection 264, receiver 263 is connected to server device 230 with connection 265, and I/O system 260 may also optionally be connected to server device 230 by connection 266 (indicated by the dash line connection) which may be a sideband connection between I/O system 260 and server device 230. Connections 264, 265 and 266 may be considered an I/O interface connecting I/O system 260 with server device 230.

Server device 230 includes transmission and reception circuitry 231 which includes receiver 232 corresponding to transmitter 262 and transmitter 233 corresponding to receiver 263. That is, receiver 232 is connected to transmitter 262 over connection 264 and receives data from transmitter 262 over connection 264. Similarly, transmitter 233 is connected to receiver 263 over connection 265 and transmits data to receiver 263 over connection 265. Thus connections 264 and 265, including connector 240, provide a communication channel between CPU 210 and server device 230.

BIOS 212 running on processor core(s) 211 may set the equalization provided by I/O system 250 for communication with server device 220 over connections 254 and 255 based on the communication protocol used to communicate with server device 220 over connections 254 and 255. For example, sideband connection 256 may provide an indication to I/O system 250 that server device supports and communicates according to a first protocol. I/O system 250 may relay the indication of the first protocol to BIOS 212. In response BIOS 212 may configure the equalization provided by I/O system 250 based on the first protocol such that I/O system 250 may optimally communicate with server device 220 using the first protocol for communications over connections 254 and 255. BIOS 212 may further be made aware that the connection between server device 220 and CPU 210 is without intermediate cables or connectors (for example, there may be a direct connection between 210 and 220 provided by a single conductor), and configure the equalization provided by I/O system 250 based on the physical connection between CPU 210 and server device 220.

In a further embodiment that omits sideband connection 256 or supplements sideband connection 256, BIOS 212 determines the communication protocol supported by server device 220 by attempting to communicate with server device 220 over connections 254 and 255 according to a sequence of communication protocols. Server device 220 may respond to communications according to the first protocol, and may fail to respond to communications according to different protocols, thus indicating to BIOS 212 that server device 220 communicates according to the first protocol. Then BIOS 212 may configure the equalization provided by I/O system 250 based on the first protocol such that I/O system 250 may optimally communicate with server device 220 using the first protocol for communications over connections 254 and 255. I/O system 250 may communicate with server device 220 and server device 220 may also configure transmission and reception circuitry 221 including receiver 222 and transmitter 223 to provide a desired equalization with regard to communicating with CPU 210 over connections 254 and 255. Thus equalization may occur at both the I/O system 250 of CPU 210 and transmission and reception circuitry 221 of server device 220.

BIOS 212 running on processor core(s) 211 may set the equalization provided by I/O system 260 for communication with server device 230 over connections 264 and 265 based on the communication protocol used to communicate with server device 230 over connections 264 and 265. For example, sideband connection 266 may provide an indication to I/O system 260 that server device supports and communicates according to a first protocol. I/O system 260 may relay the indication of the first protocol to BIOS 212. In response BIOS 212 may configure the equalization provided by I/O system 260 based on the first protocol such that I/O system 260 may optimally communicate with server device 230 using the first protocol for communications over connections 264 and 265. BIOS 212 may further be made aware that the connection between server device 230 and CPU 210 is with intermediate connector 240, and configure the equalization provided by I/O system 260 based on the physical connection between CPU 210 and server device 230, including connector 240.

Thus, in FIG. 2, equalization will be set based on the protocol used by server device 220 or 230 for communication. The equalization will be set at CPU 210 and may be additionally set at server devices 220 and 230. Setting the equalization may involve using or omitting one or more types of equalization or setting an amplification gain or boost. Thus, different equalizations for different server devices for different protocols may have different power consumptions and consequently, efficiencies. In systems with multiple devices connected to a CPU, the energy savings due to individual equalizations with regard to the devices are compounded by the number of devices; further, there is less heat energy generated to be dissipated, such that less cooling is needed, thereby saving power for cooling. BIOS 212 may set equalizations dynamically when server devices are connected to CPU 210, or equalizations may be set at an initialization or start up of CPU 210 or the server devices.

While in FIG. 2, two I/O systems 250 and 260 are shown, this is by way of example, not limitation, and a CPU or processor may support multiple I/O systems and interface with multiple different devices via the multiple I/O systems. As would be understood by one or skill in the art, the equalization provided by individual I/O systems may be individually set for the individual I/O system to communicate with a device according to a communication protocol.

Figure 3:
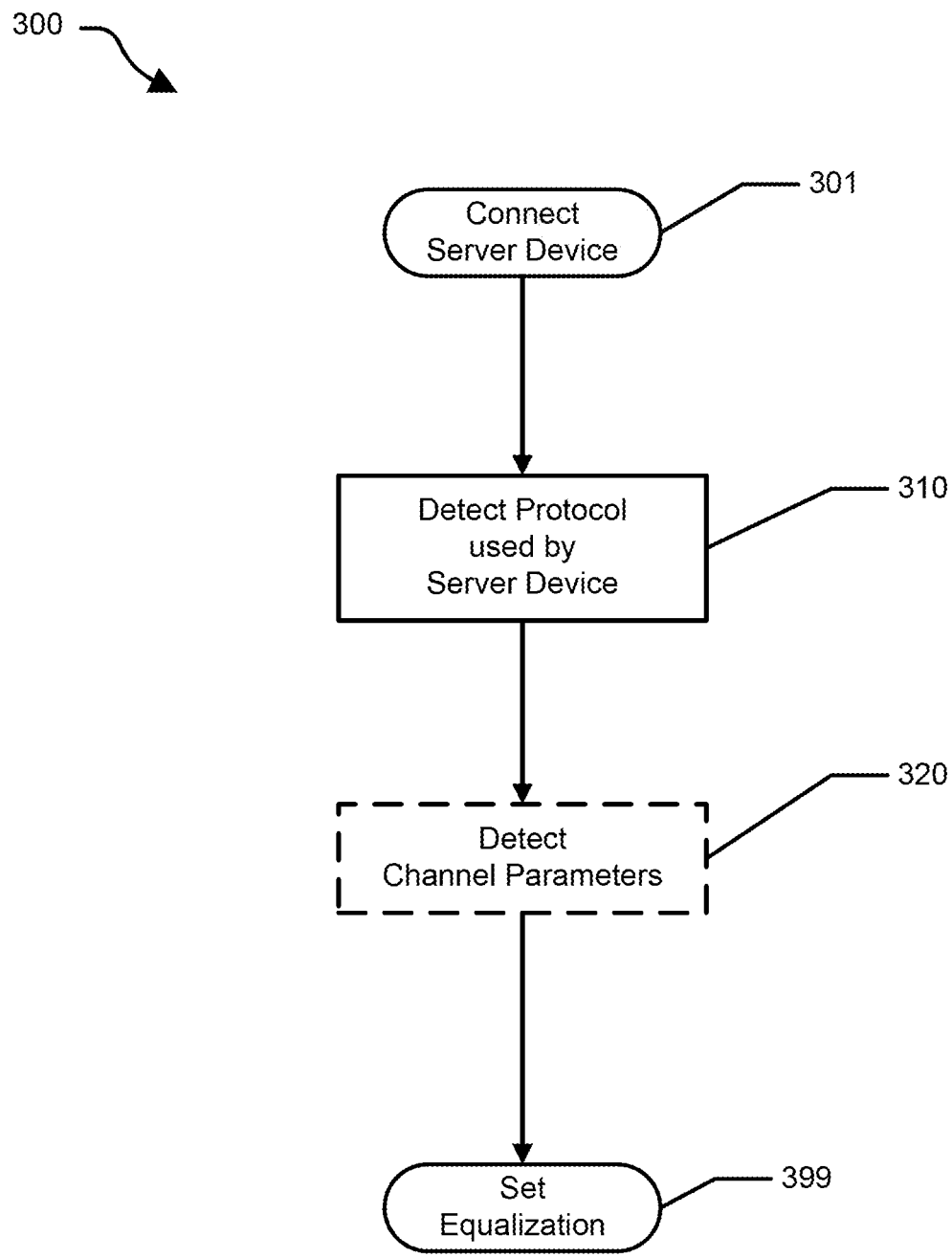
FIG. 3 illustrates a flowchart for equalization between a processor and a device according to an embodiment of the present disclosure.

FIG. 3 shows a flowchart 300 for setting equalization between a processor and a server device. At 301, the server device is connected to the processor. In an example, the processor may be powered on such that the server device is connected to a powered and operating processor, in a hot plug of the server device to the server. In another example, the processor may be quiescent when the server device is connected, and the processor may be powered on after the connection of the server device to the processor. At 310, the protocol used by the server device is detected by the processor or BIOS hosted by the processor. For example, a bus line from the server device may provide an indication of the protocol supported by the server device. At 320, the processor or host may detect communication channel parameters of a connection between processor and server device. At 399, equalization is set based on the protocol used by the server device. The equalization may further be set based on the communication channel parameters. The equalization may be set at the processor and may be set at the server device.

Setting equalization and shown and described with regard to FIG. 3 may be performed individually for any number of devices connected to the processor and may be based on the communication protocol used by the devices. By setting equalization for communication with a device based on the protocol used by the device, the equalization may be optimally set and under and over (or unnecessary) equalization may be avoided. By avoiding unnecessary equalization, for example, performed at a processor, power may be conserved because unnecessary equalizations or equalization stages or processes are avoided, thereby saving power. Thus, embodiments described herein mitigate I/O system power consumption of a processor system communicating with devices.

Figure 4:
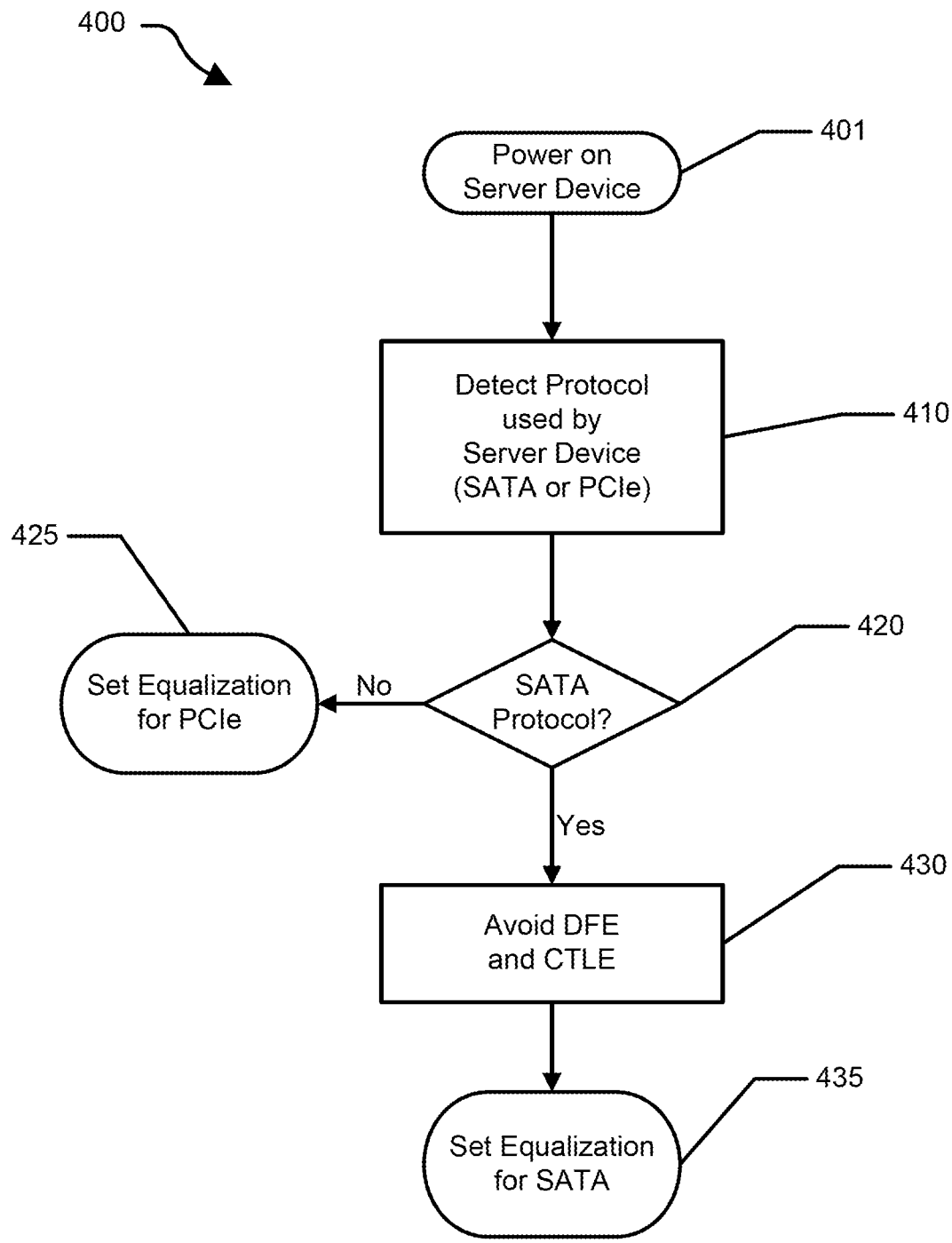
FIG. 4 illustrates a flowchart for equalization between a processor and a device according to an embodiment of the present disclosure.

FIG. 4 shows a flowchart 400 of an embodiment of setting equalization between a processor and a server device. Flowchart 400 begins at 401 by powering on a server device, for example, by attaching the server device to a server and providing a power supply from the server to the server device. At 410, the protocol used by the serve device for communication is detected. The protocol may be for example, SATA, or PCIe. At 420, if the detected protocol is not SATA, then equalization is set for the PCIe protocol at 425, and 400 ends. If, at 420, the detected protocol is SATA, then at 430 DFE and CTLE equalizations are eschewed. Subsequently, equalization is set for the SATA protocol at 435 while DFE and CTLE equalizations are eschewed, and 400 ends. Thus the equalizations set for SATA and PCIe protocols may differ.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a central processing unit (CPU) with a first I/O system and configured to host a BIOS; and
   a first device communicatively connected to the first I/O system by a first connection, wherein the BIOS is configured to utilize either a first equalization or a second equalization when the first device utilizes a first communication protocol or second communication protocol, respectively, wherein the second equalization includes a decision feedback equalization, and wherein the first equalization includes setting of an equalization selected from a group consisting of: feed forward equalization; analog equalization; variable gain amplification equalization; and boost amplification equalization, wherein the first communication protocol includes a serial advanced technology attachment communication protocol, and wherein the second communication protocol includes a peripheral component interconnect express protocol.

2. The information handling system of claim 1, further comprising a second device, wherein the CPU further comprises a second I/O system and the second device is connected to the second I/O system by a second connection including a connector, and wherein the BIOS sets the first equalization or the second equalization for communication in the second device based on the utilized first communication protocol or the second communication protocol and one or more properties of the connector, wherein the second communication protocol differs from the first communication protocol.

3. The information handling system of claim 1, wherein the first device comprises first device transmission and reception circuitry, wherein the first equalization or the second equalization for communication in the first device transmission and reception circuitry is based on a communication from the CPU.

4. The information handling system of claim 1, further comprising a sideband connection connecting the first device and the CPU, wherein the BIOS receives an indication of the first communication protocol over the sideband connection.

5. The information handling system of claim 4, wherein the first connection comprises the sideband connection and the first device sends an indication of the first communication protocol over the sideband connection.

6. The information handling system of claim 1, wherein the BIOS attempts to communicate with the first device according to one or more communication protocols including the first communication protocol.

7. The information handling system of claim 6, wherein the first device responds to a communication according to the first communication protocol.

8. The information handling system of claim 1, wherein the second equalization further includes a continuous time linear equalization.

9. A server comprising:
   a processor with a first I/O system and configured to host a BIOS;
   a first server device communicatively connected to the first I/O system by a first connection, wherein the BIOS is configured to utilize a first equalization when the first server device utilizes a first communication protocol including a serial advanced technology attachment communication protocol, and wherein the first equalization includes setting an equalization to conserve power in the server, wherein the equalization of the first equalization is selected from a group consisting of: feed forward equalization;
   analog equalization; variable gain amplification equalization; and boost amplification equalization; and
   a second device, wherein the processor further comprises a second I/O system and the second device is connected to the second I/O system by a second connection including a connector, and wherein the BIOS determines a second communication protocol used by the second device for communication and utilizes a second equalization for communication with the second device based on the second communication protocol and one or more properties of the connector, wherein the second equalization includes a decision feedback equalization, and wherein the second communication protocol includes a peripheral component interconnect express protocol.

10. The server of claim 9, wherein the first equalization further includes the setting of the equalization other than a continuous time linear equalization to decrease power in cooling components of the server.

11. The server of claim 9, wherein the first server device comprises first server device transmission and reception circuitry, wherein the setting of the first equalization for communication in the first server device transmission and reception circuitry is based on a communication from the CPU.

12. The server of claim 9 further comprising a sideband connection connecting the first server device and the CPU, wherein the BIOS receives an indication of the serial advanced technology attachment communication protocol over the sideband connection.

13. The server of claim 12, wherein the first connection comprises the sideband connection and the first server device sends an indication of the serial advanced technology attachment communication protocol over the sideband connection.

14. A method comprising:
- determining a communication protocol utilized by a first device to communicate to a processor comprising a first I/O system connected to the first device, the communication protocol including a first communication protocol or a second communication protocol that utilizes a first equalization or a second equalization, respectively;
- utilizing the first equalization or the second equalization in the first device based on the determined communication protocol, wherein second equalization includes a decision feedback equalization, and wherein the first equalization includes setting of an equalization selected from a group consisting of: feed forward equalization; analog equalization; variable gain amplification equalization; and boost amplification equalization, wherein the first communication protocol includes a serial advanced technology attachment communication protocol, and wherein the second communication protocol includes a peripheral component interconnect express protocol; and
- using the determined communication protocol by the processor in communicating to the first device.

15. The method of claim 14 further including eschewing of a continuous time linear equalization when the first device utilizes the first equalization.

* * * * *